United States Patent
Ogawa et al.

(10) Patent No.: US 9,225,168 B2
(45) Date of Patent: Dec. 29, 2015

(54) SWITCHING POWER SUPPLY DEVICE AND CONTROL CIRCUIT THEREOF

(71) Applicants: Taichi Ogawa, Tokyo (JP); Takeshi Ueno, Kawasaki (JP); Tetsuro Itakura, Tokyo (JP)

(72) Inventors: Taichi Ogawa, Tokyo (JP); Takeshi Ueno, Kawasaki (JP); Tetsuro Itakura, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 614 days.

(21) Appl. No.: 13/692,044

(22) Filed: Dec. 3, 2012

(65) Prior Publication Data
US 2013/0241289 A1     Sep. 19, 2013

(30) Foreign Application Priority Data

Mar. 16, 2012   (JP) .................................. 2012-60791

(51) Int. Cl.
| | |
|---|---|
| *H02J 1/00* | (2006.01) |
| *H02M 3/158* | (2006.01) |
| *H02M 3/156* | (2006.01) |

(52) U.S. Cl.
CPC .................. *H02J 1/00* (2013.01); *H02M 3/158* (2013.01); *H02M 2003/1566* (2013.01); *Y10T 307/549* (2015.04)

(58) Field of Classification Search
CPC . H02J 1/00; H02M 3/158; H02M 2003/1566; Y10T 307/549
USPC .......................................................... 307/52
See application file for complete search history.

(56) References Cited

U.S. PATENT DOCUMENTS

| | | | |
|---|---|---|---|
| 6,975,494 B2 | 12/2005 | Tang et al. | |
| 2003/0006650 A1* | 1/2003 | Tang | G06F 1/26 307/43 |
| 2008/0012544 A1* | 1/2008 | Krein | H02M 1/15 323/282 |
| 2012/0105032 A1* | 5/2012 | Huard | H02M 3/158 323/271 |

OTHER PUBLICATIONS

Japanese Office Action dated Jul. 4, 2014, in counterpart Japanese Application No. 2012-060791.
P. Shenoy et al; Beyond Time-Optimality: Energy-Based Control of Augmented Buck Converters for Near Ideal Load Transient Response; 2011 IEEE; pp. 916-922.

* cited by examiner

*Primary Examiner* — Scott Bauer
(74) *Attorney, Agent, or Firm* — Holtz, Holtz, Goodman & Chick PC

(57) ABSTRACT

A control circuit of a switching power supply device has a first current source capable of supplying an auxiliary current to a load resistance of the switching power supply device when a load current flowing through the load resistance increases, a second current source capable of pulling in a current from the load resistance when the load current flowing through the load resistance decreases, and an auxiliary current controller configured to activate the first current source or the second current source from when a variation in the load current flowing through the load resistance is detected to have exceeded a predetermined level until a current flowing through the inductor becomes equal to the current flowing through the load resistance.

20 Claims, 11 Drawing Sheets

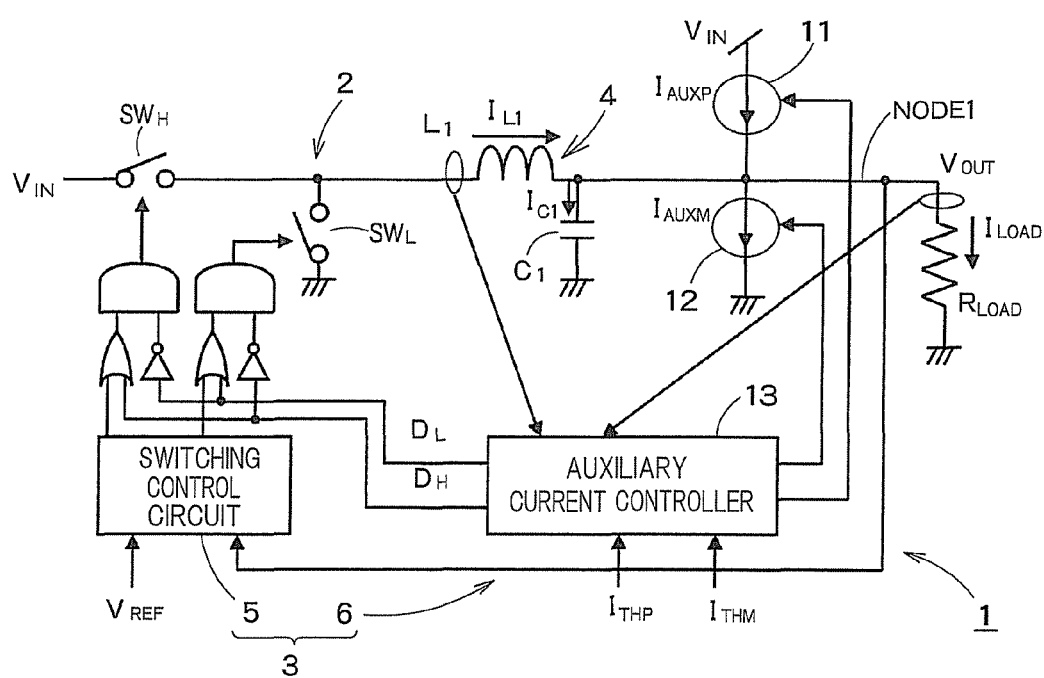
F I G. 1

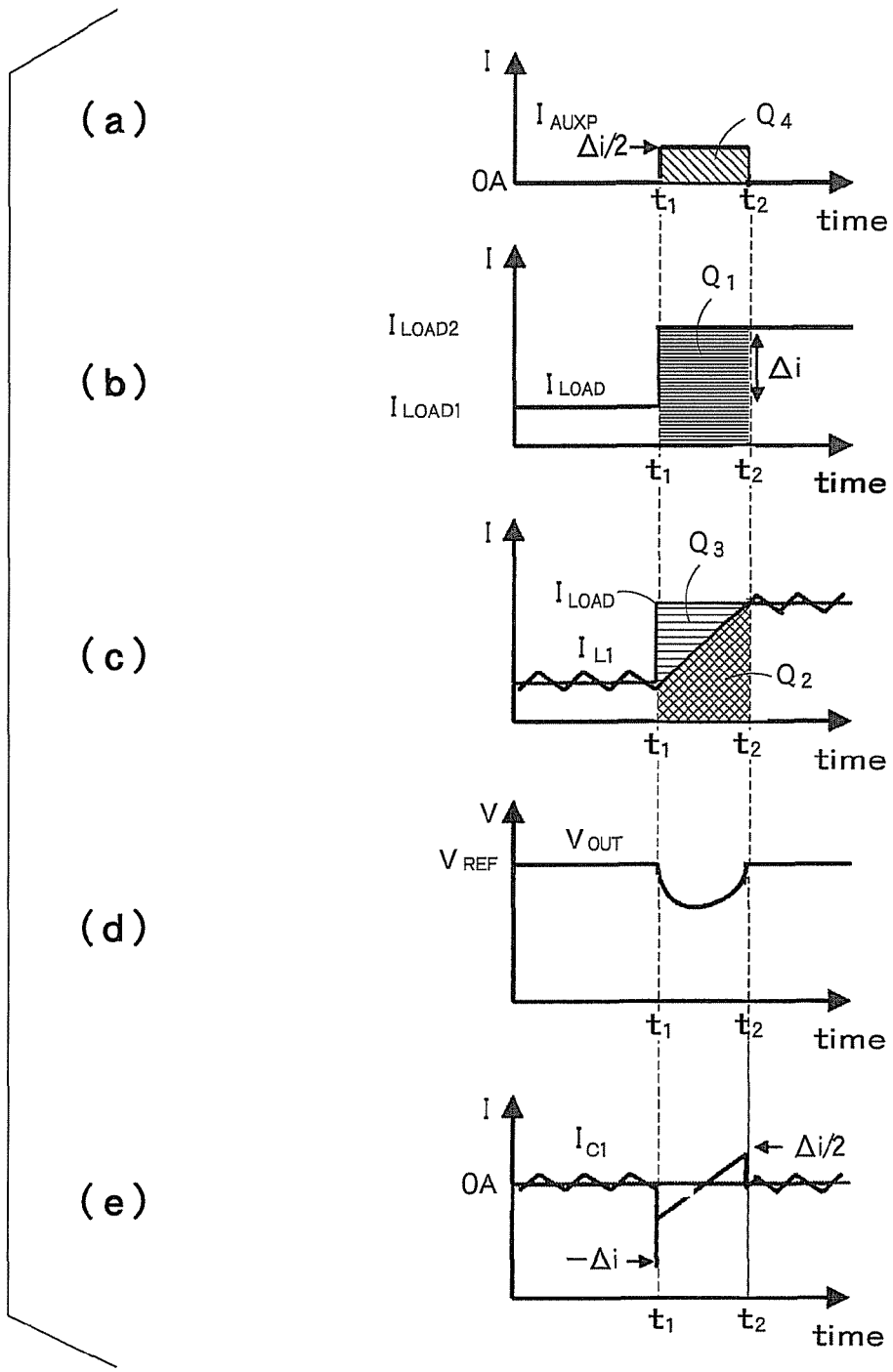
F I G. 2

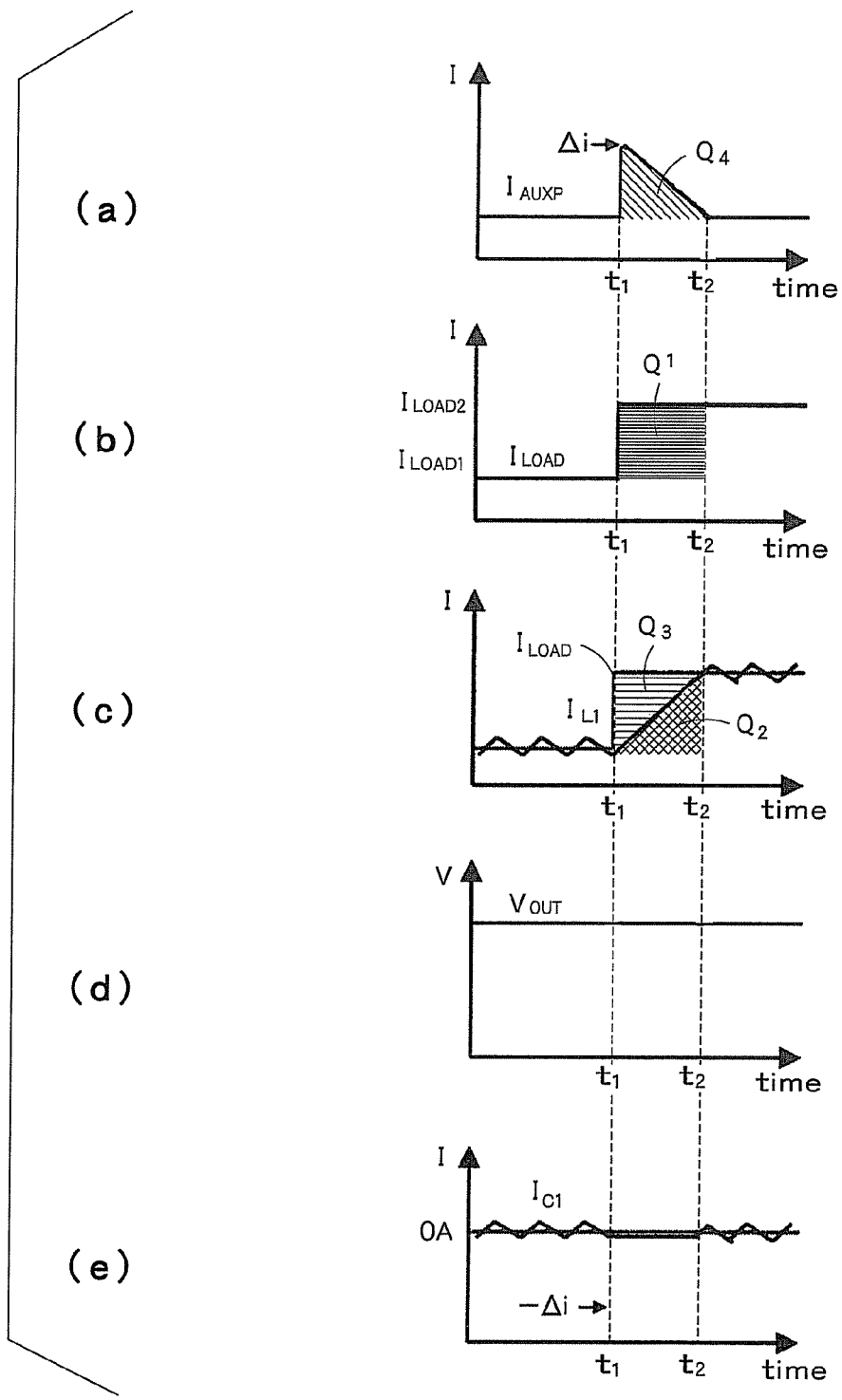
F I G. 6

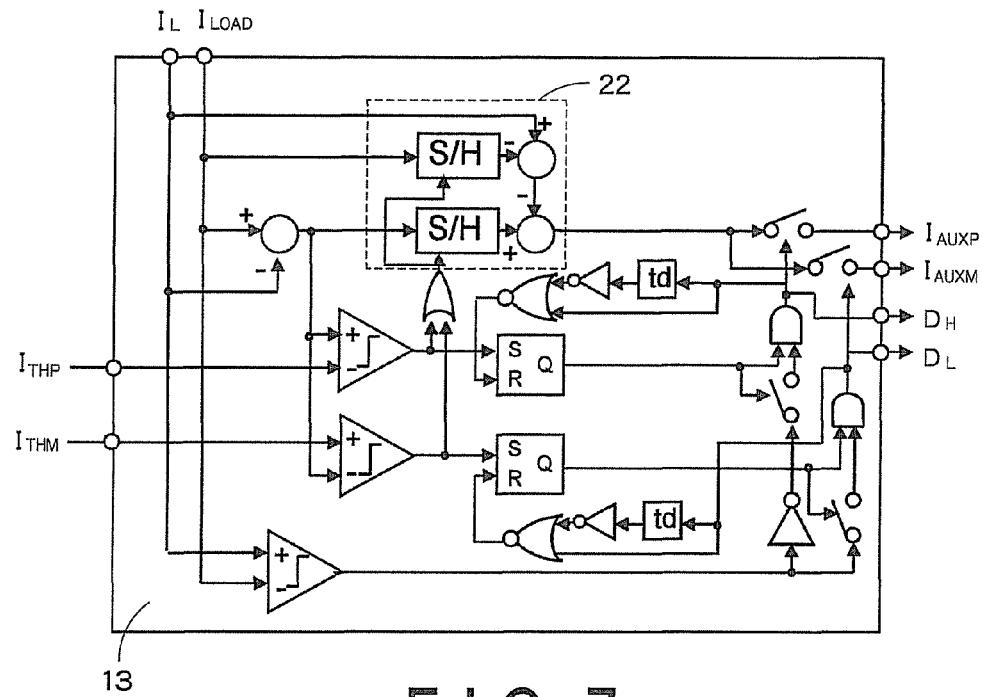
F I G. 7
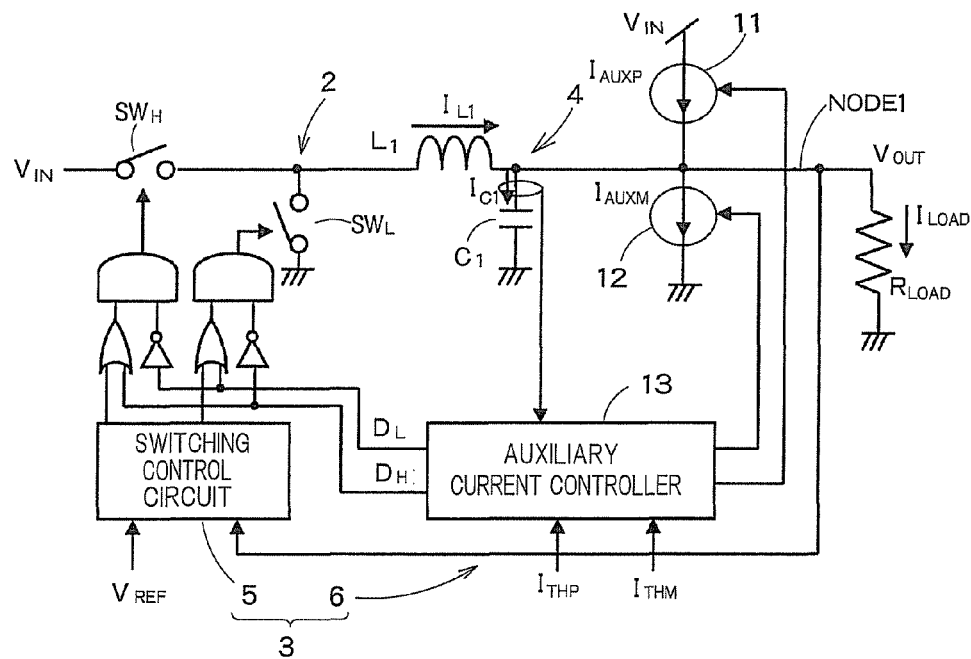
F I G. 8

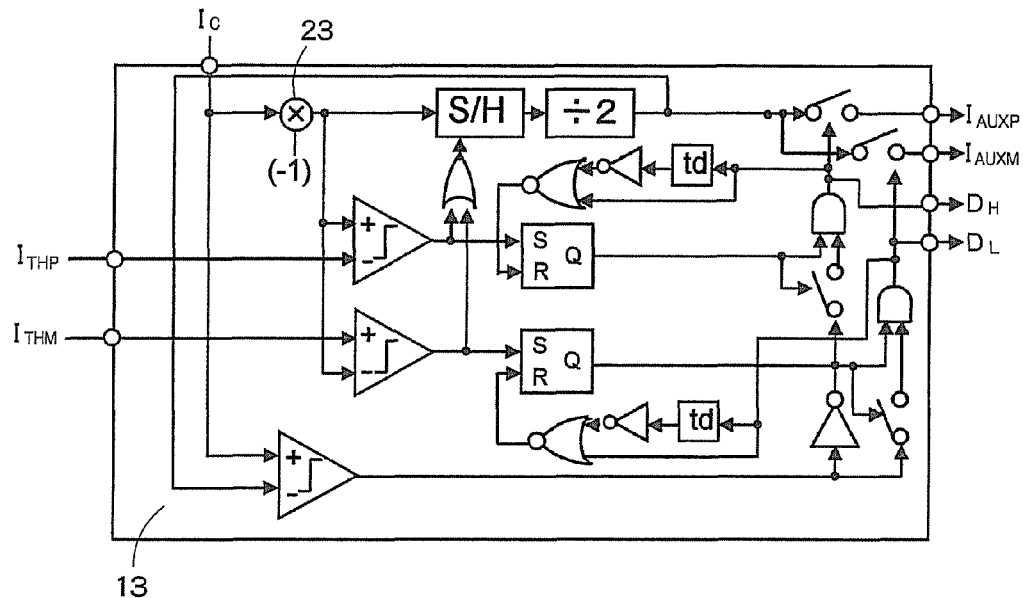
F I G. 9
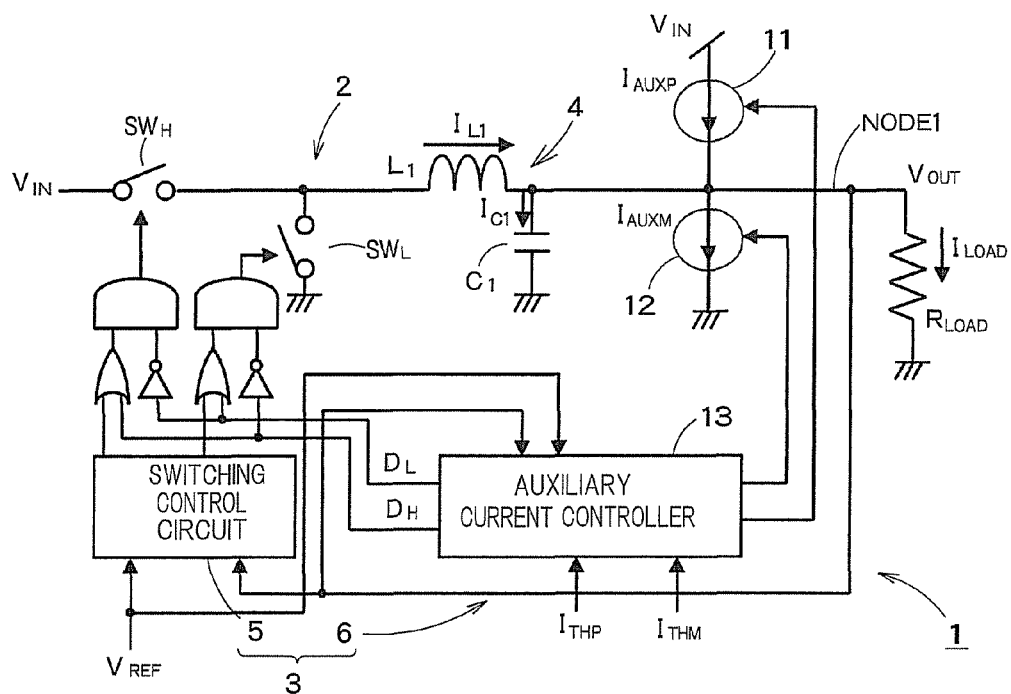
F I G. 10

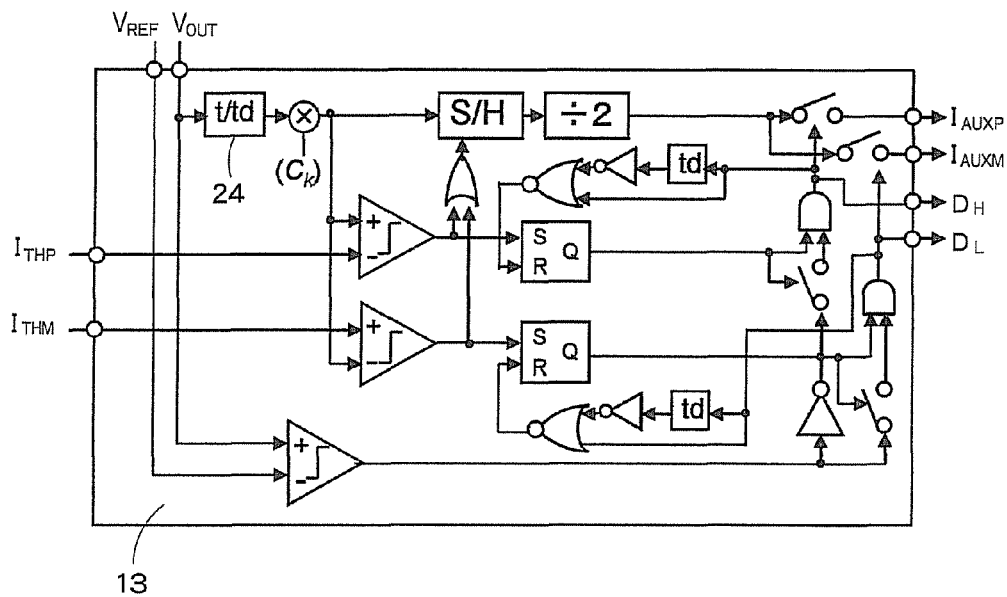
F I G. 11
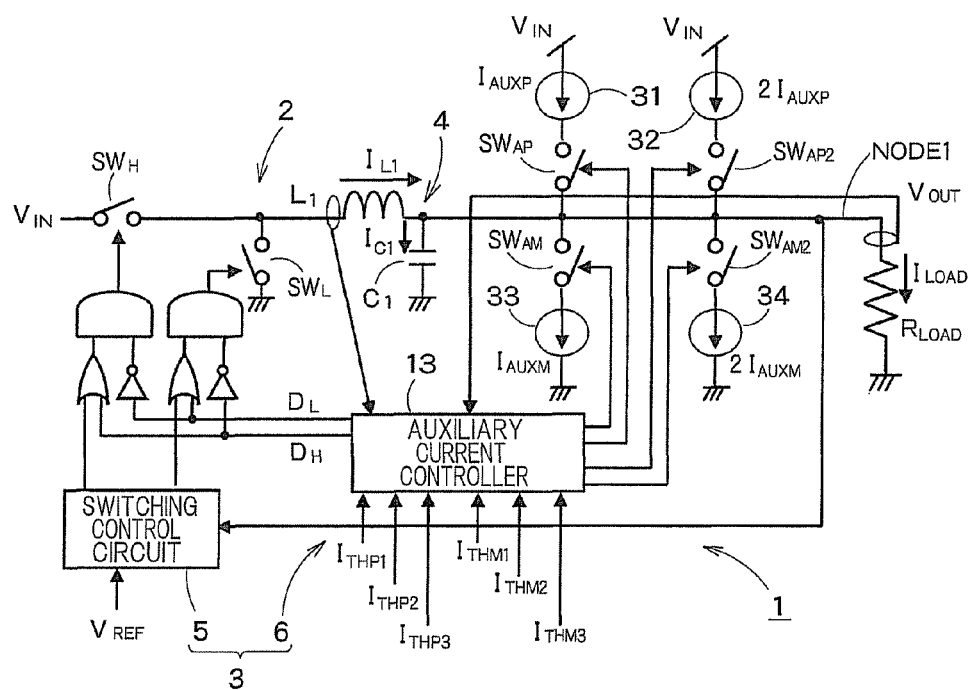
F I G. 12

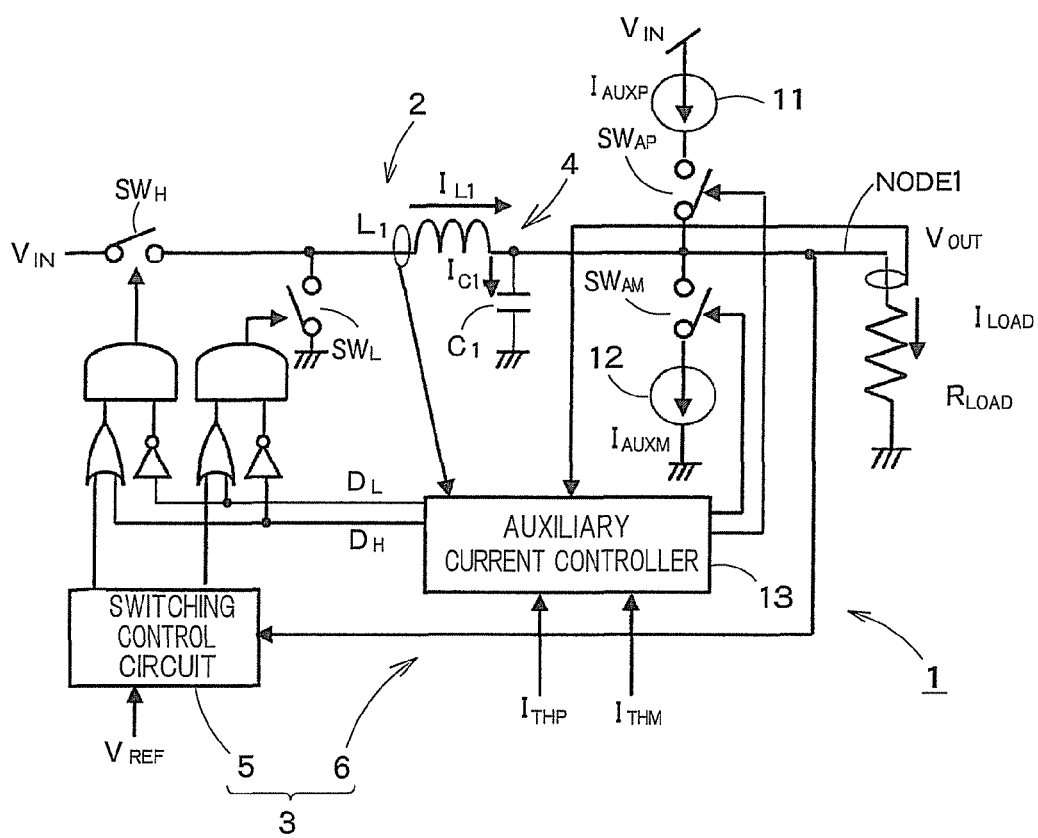
F I G. 13

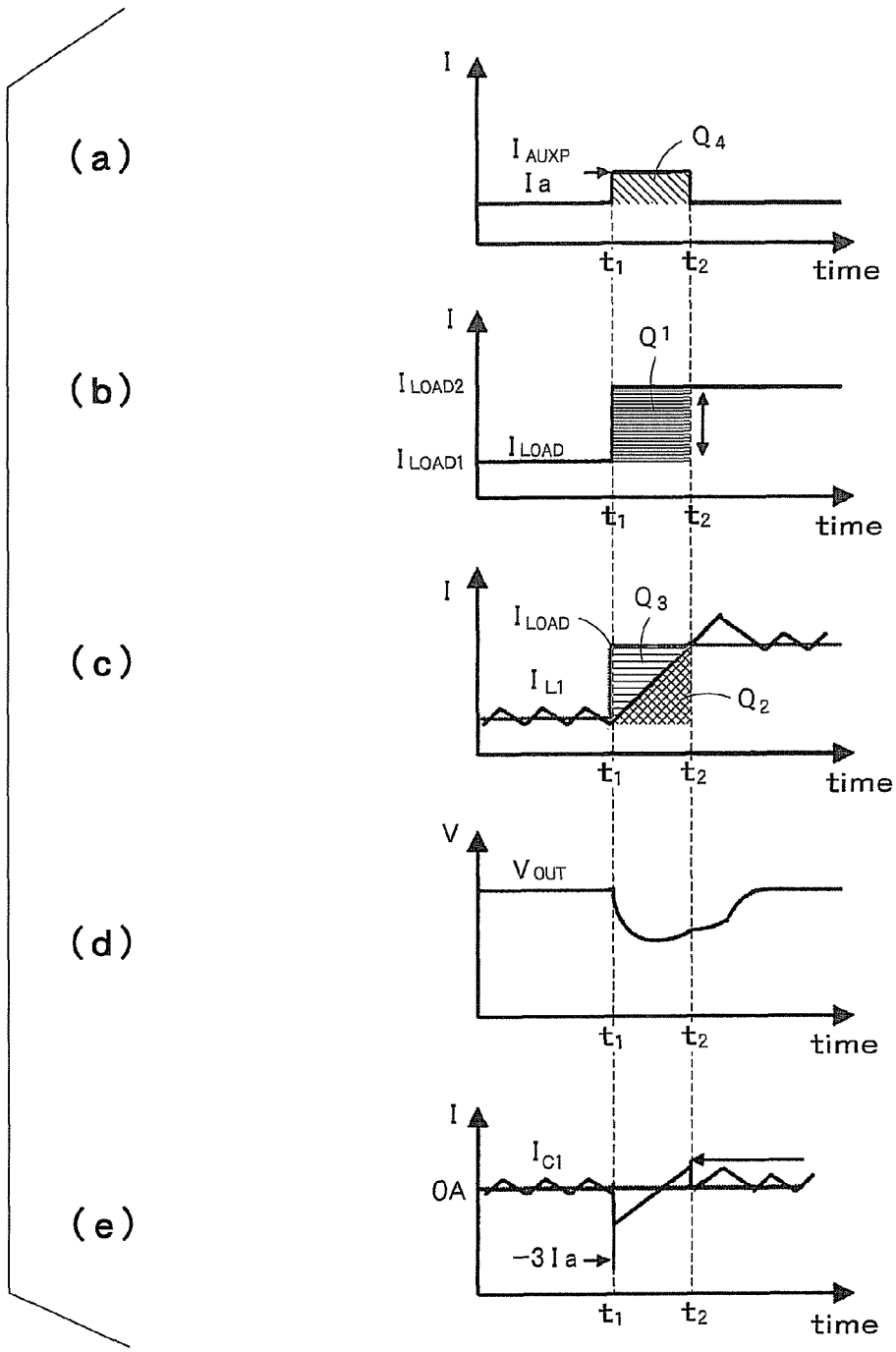
F I G. 14

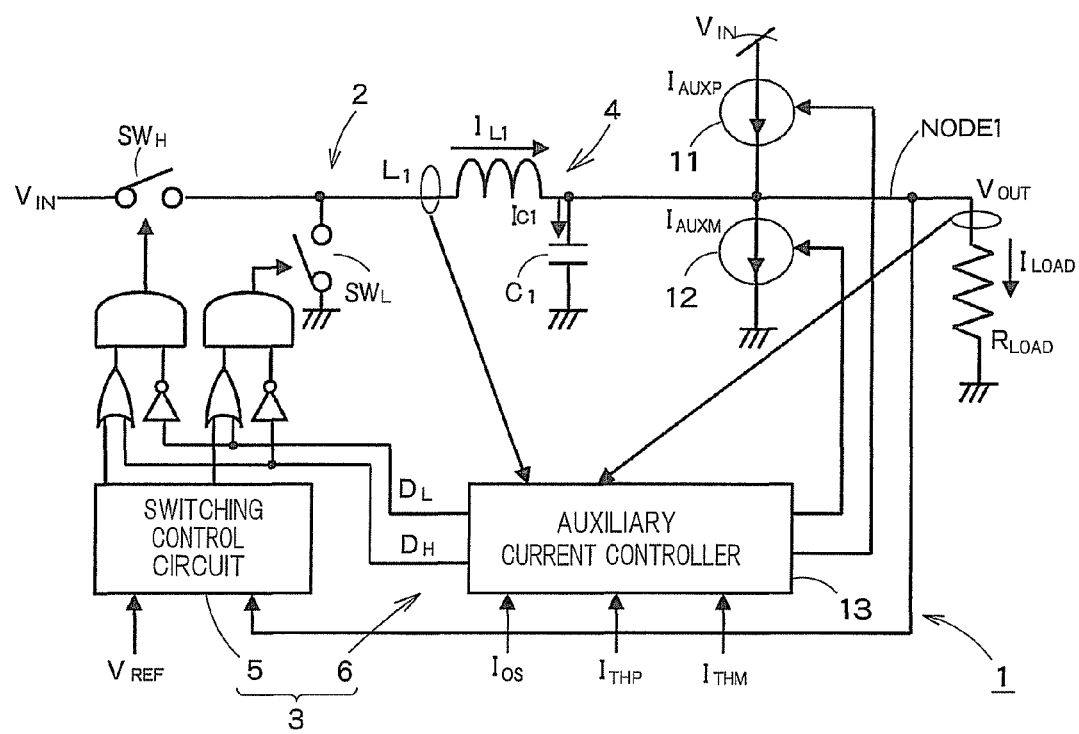
F I G. 15

SWITCHING POWER SUPPLY DEVICE AND CONTROL CIRCUIT THEREOF

CROSS REFERENCE TO RELATED APPLICATIONS

This application is based upon and claims the benefit of priority from the prior Japanese Patent Application No. 2012-60791, filed on Mar. 16, 2012, the entire contents of which are incorporated herein by reference.

FIELD

Embodiments of the present invention relate to a switching power supply device having a High-side switch, a Low-side switch, and a lowpass filter, and to a control circuit of the switching power supply device.

BACKGROUND

A switching power supply device is used in various electronic machines since it can be downsized. When the switching power supply device is used to drive an electronic component such as CPU of which load current greatly varies, output voltage must be controlled to quickly recover a desired voltage when the load current varies.

As a conventional technique for performing such control, there has been proposed a technique in which a special current path is provided to supply/pull in current to/from an inductor or a capacitor forming a lowpass filter in the switching power supply device, when the load varies.

However, even when such a current path is provided, the output voltage changes depending on the load variation, and thus the variation in the output voltage cannot be restrained until the output voltage is set to a desired voltage.

Further, there is another conventional technique in which a plurality of current sources are connected to the output voltage line of the switching power supply device and one current source to be actually activated can be selected from these current sources depending on the load variation. However, since each current source operates at different timing, the output voltage eventually changes depending on the load variation and the variation in the output voltage cannot be restrained until the output voltage returns to a desired voltage.

BRIEF DESCRIPTION OF THE DRAWINGS

FIG. 1 is a block diagram showing a schematic structure of a switching power supply device 1 according to a first embodiment.

FIGS. 2(a) to 2(e) show waveform diagrams of nodes in the switching power supply device 1 of FIG. 1 when load current increases.

FIGS. 6(a) to 6(e) show waveform diagrams of nodes in the switching power supply device 1 of FIG. 1 when the load current increases.

FIG. 7 is a circuit diagram showing an example of the internal configuration of the auxiliary current controller 13 capable of generating auxiliary current having a saw-tooth waveform.

FIG. 8 is a block diagram showing a schematic structure of the switching power supply device 1 according to a second embodiment.

FIG. 9 is a circuit diagram showing an example of the internal configuration of the auxiliary current controller 13 in the second embodiment.

FIG. 10 is a block diagram showing a schematic structure of the switching power supply device 1 according to a third embodiment.

FIG. 11 is a circuit diagram showing an example of the internal configuration of the auxiliary current controller 13 in the third embodiment.

FIG. 12 is a block diagram showing a schematic structure of the switching power supply device 1 according to a fourth embodiment.

FIG. 13 is a block diagram showing a schematic structure of the switching power supply device 1 according to a fifth embodiment.

FIG. 14 shows waveform diagrams of nodes in the switching power supply device 1 of FIG. 13.

FIG. 15 is a block diagram showing a schematic structure of the switching power supply device 1 according to a sixth embodiment.

DETAILED DESCRIPTION

Figure 3:
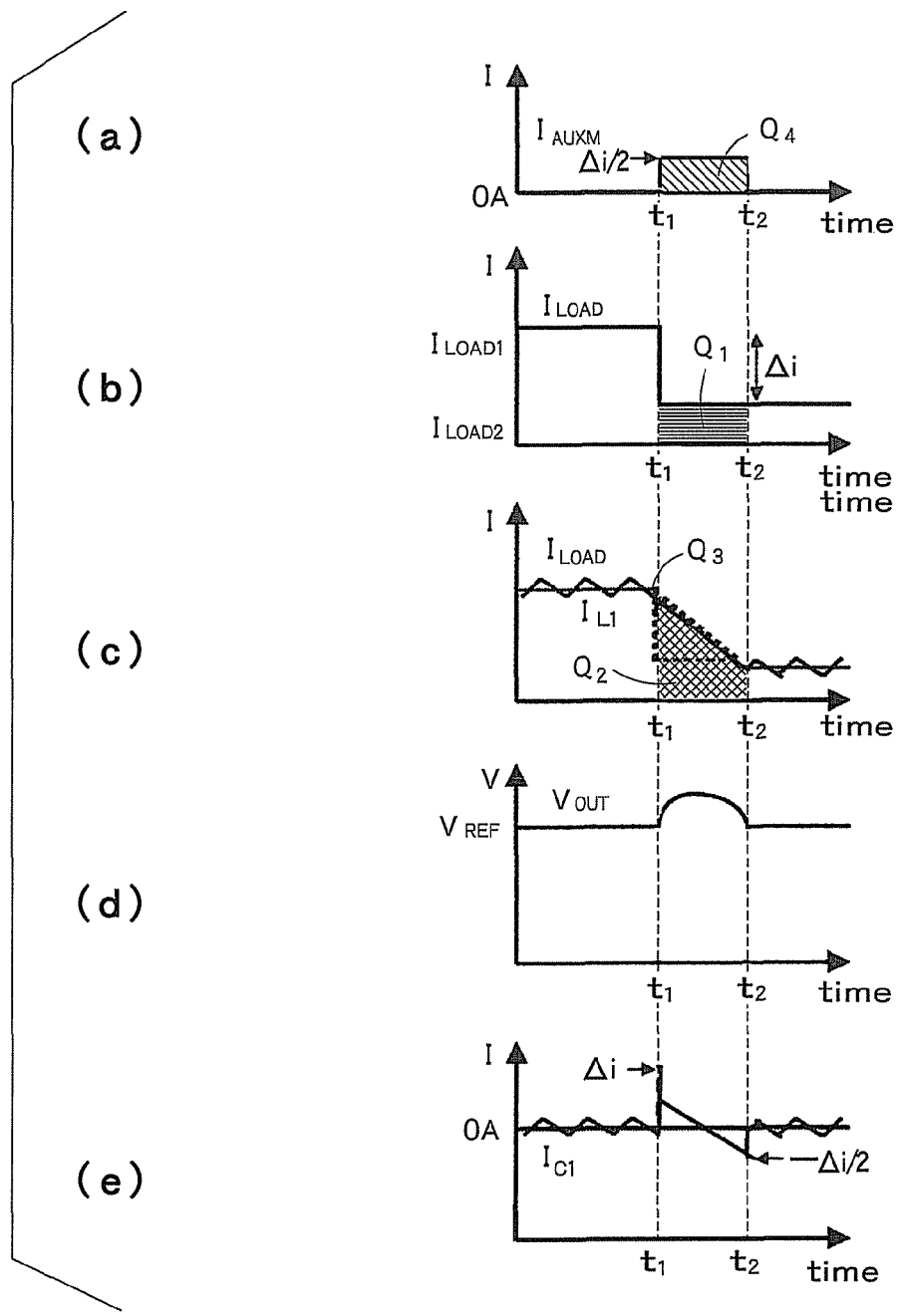
FIGS. 3(a) to 3(e) show waveform diagrams of nodes in the switching power supply device 1 of FIG. 1 when the load current decreases.

According to one embodiment of a control circuit of a switching power supply device, the switching power supply device generates a square wave voltage from an input voltage by switching a High-side switch and a Low-side switch and generates a direct-current output voltage by smoothing the square wave voltage by a lowpass filter comprising an inductor and a capacitor. The control circuit has a first current source capable of supplying an auxiliary current to a load resistance of the switching power supply device when a load current flowing through the load resistance increases, a second current source capable of pulling in a current from the load resistance when the load current flowing through the load resistance decreases, and an auxiliary current controller configured to activate the first current source or the second current source from when a variation in the load current flowing through the load resistance is detected to have exceeded a predetermined level until a current flowing through the inductor becomes equal to the current flowing through the load resistance.

Embodiments will now be explained with reference to the accompanying drawings.

First Embodiment

FIG. 1 is a block diagram showing a schematic structure of a switching power supply device 1 according to a first embodiment. The switching power supply device 1 of FIG. 1 has a power stage circuit 2 and a control circuit 3.

The power stage circuit 2 has a High-side switch $SW_H$, a Low-side switch $SW_L$, and a lowpass filter 4.

The High-side switch $SW_H$ is connected between an input voltage line $V_{IN}$ and the input terminal of the lowpass filter 4. The Low-side switch $SW_L$ is connected between a ground line and the input terminal of the lowpass filter 4. The lowpass filter 4 has an inductor $L_1$ connected between an output voltage line $V_{OUT}$ and the connection node of the High-side switch $SW_H$ and the Low-side switch $SW_L$, and a capacitor $C_1$ connected between the output voltage line $V_{OUT}$ and a ground line.

The power stage circuit 2 of FIG. 1 is a step-down circuit for generating output voltage $V_{OUT}$ having a lower voltage level than input voltage $V_{IN}$. However, the power stage circuit 2 may be a booster circuit.

The output voltage line $V_{OUT}$ is connected to a load resistance $R_{LOAD}$. The present embodiment intends to restrain the variation in the output voltage $V_{OUT}$ caused by a sudden change in the current flowing through the load resistance $R_{LOAD}$.

The control circuit 3 has a switching control circuit 5 for controlling the High-side switch $SW_H$ and the Low-side switch $SW_L$, and a load variation control circuit 6 for controlling the output voltage $V_{OUT}$ responding to load variation.

The switching control circuit 5, whose internal configuration is omitted in FIG. 1, compares the output voltage $V_{OUT}$ with reference voltage $V_{REF}$, and controls switching between the High-side switch $SW_H$ and the Low-side switch $SW_L$ so that the output voltage $V_{OUT}$ becomes consistent with the reference voltage $V_{REF}$.

It is possible to make a chip including the whole of the control circuit 3, a chip including only the load variation control circuit 6 as a part of the control circuit 3, and a chip including at least a part of the power stage circuit 2 and the load variation control circuit 6, but whether or not to make such a chip may be arbitrarily determined.

Hereinafter, the configuration and operation of the load variation control circuit 6 will be mainly explained. The load variation control circuit 6 of FIG. 1 has a first current source 11, a second current source 12, and an auxiliary current controller 13.

The first current source 11 is used to supply auxiliary current to the load resistance $R_{LOAD}$ when load current $I_{LOAD}$ flowing through the load resistance $R_{LOAD}$ increases. The second current source 12 is used to pull in current from the load resistance $R_{LOAD}$ when the load current $I_{LOAD}$ decreases.

The auxiliary current controller 13 performs control to activate the first current source 11 or the second current source 12 from when the variation in the load current $I_{LOAD}$ is detected to have exceeded a predetermined level until the current flowing through the inductor $L_1$ becomes equal to the current flowing through the load resistance $R_{LOAD}$. Further, the auxiliary current controller 13 controls switching between the High-side switch $SW_H$ and the Low-side switch $SW_L$ when the load current $I_{LOAD}$ changes.

More specifically, when a difference ($I_{LOAD}-I_{L1}$) between the load current $I_{LOAD}$ and current $I_{L1}$ flowing through the inductor $L_1$ is larger than a threshold value $I_{THP}$, the auxiliary current controller 13 determines the amount of auxiliary current $I_{AUXP}$ supplied from the first current source 11 to the output voltage line $V_{OUT}$. This auxiliary current $I_{AUXP}$ is supplied until the load current $I_{LOAD}$ becomes consistent with the inductor current $I_{L1}$. While the auxiliary current $I_{AUXP}$ is supplied from the first current source 11, the auxiliary current controller 13 continuously increases the inductor current $I_{L1}$ by keeping the High-side switch $SW_H$ turned on and keeping the Low-side switch $SW_L$ turned off.

Further, when a difference ($I_{LOAD}-I_{L1}$) between the load current $I_{LOAD}$ and the inductor current $I_{L1}$ is smaller than a threshold value $I_{THM}$, the auxiliary current controller 13 determines the amount of auxiliary current $I_{AUXM}$ pulled in from the output voltage line $V_{OUT}$ to the second current source 12. This auxiliary current $I_{AUXM}$ is supplied until the load current $I_{LOAD}$ becomes consistent with the inductor current $I_{L1}$. While the auxiliary current $I_{AUXM}$ is pulled in to the second current source 12, the auxiliary current controller 13 continuously reduces the inductor current $I_{L1}$ by keeping the Low-side switch $SW_L$ turned on and keeping the High-side switch $SW_H$ turned off.

FIG. 2 shows waveform diagrams of nodes in the switching power supply device 1 of FIG. 1 when the load current $I_{LOAD}$ suddenly increases due to a load variation occurring in the period from Time t1 to t2. FIG. 2(*a*) is a current waveform diagram of the auxiliary current $I_{AUXP}$, FIG. 2(*b*) is a current waveform diagram of the load current $I_{LOAD}$, FIG. 2(*c*) is a current waveform diagram of the inductor current $I_{L1}$, FIG. 2(*d*) is a voltage waveform diagram of the output voltage $V_{OUT}$, and FIG. 2(*e*) is a current waveform diagram of capacitor current $I_{C1}$ flowing through the capacitor $C_1$.

As shown in FIG. 2(*b*), at Time t1, the load current $I_{LOAD}$ suddenly rises from $I_{LOAD1}$ to $I_{LOAD2}$. If the auxiliary current controller 13 is not provided, the inductor current $I_{L1}$ flowing through the inductor $L_1$ is controlled by the switching control circuit 5 and linearly rises from Time t1 to Time t2. The output voltage $V_{OUT}$ temporarily drops greatly when the output voltage $V_{OUT}$ is controlled only by the inductor $L_1$, and thus it takes time until the output voltage $V_{OUT}$ recovers the original voltage value.

In the present embodiment, at Time t1, the High-side switch $SW_H$ is turned on to pass the inductor current $I_{L1}$, and further the first current source 11 is activated to supply the auxiliary current $I_{AUXP}$ from the first current source 11 to the load resistance $R_{LOAD}$. As shown in FIG. 2(*a*), the auxiliary current $I_{AUXP}$ is constant current. At Time t1, the load current $I_{LOAD}$ suddenly rises from $I_{LOAD1}$ to $I_{LOAD2}$, but the inductor current $I_{L1}$ increases linearly. Since the auxiliary current $I_{AUXP}$ is constant current, the output voltage $V_{OUT}$ temporarily drops greatly immediately after Time t1, as shown in FIG. 2(*d*). After that, the falling rate of the output voltage $V_{OUT}$ rapidly becomes small due to the linear increase in the inductor current $I_{L1}$ and the addition of the constant auxiliary current $I_{AUXP}$, and then the output voltage $V_{OUT}$ begins to rise.

When the load current $I_{LOAD}$ becomes consistent with the inductor current $I_{L1}$ at Time t2, the auxiliary current controller 13 stops supplying the auxiliary current $I_{AUXP}$ from the first current source 11. Therefore, after Time t2, switching between the High-side switch $SW_H$ and the Low-side switch $SW_L$ is controlled only by the switching control circuit 5.

As shown in FIG. 2(*e*), at Time t1, the capacitor current $I_{C1}$ flowing through the capacitor $C_1$ in the lowpass filter 4 suddenly decreases by $\Delta i$. This is because discharge current from the capacitor $C_1$ is supplied to the load resistance $R_{LOAD}$ corresponding to the increase in the load current $I_{LOAD}$. After that, the capacitor current linearly increases due to the supply of the auxiliary current $I_{AUXP}$.

In the present embodiment, the amount of charge in the load current $I_{LOAD}$ increasing between Time t1 and t2 is defined as Q1 as shown in FIG. 2(*b*), and the amount of charge in the inductor current $I_{L1}$ increasing between Time t1 and t2 is defined as Q2 as shown in FIG. 2(*c*). Thus, Q3, which is the difference between Q1 and Q2, is a deficient amount of charge. By compensating this deficient amount Q3 with Q4 (=Q3) showing the amount of charge in the auxiliary current $I_{AUXP}$ shown in FIG. 2(*a*), the output voltage $V_{OUT}$ recovers the original voltage level at Time t2.

FIG. 3 shows waveform diagrams of nodes in the switching power supply device 1 of FIG. 1 when the load current $I_{LOAD}$ suddenly decreases due to a load variation occurring in the period between Time t1 and t2.

As shown in FIG. 3(*b*), at Time t1, the load current $I_{LOAD}$ suddenly falls from $I_{LOAD1}$ to $I_{LOAD2}$. If the auxiliary current controller 13 is not provided, the inductor current $I_{L1}$ flowing through the inductor $L_1$ is controlled by the switching control circuit 5 and linearly falls from Time t1 to Time t2. The output voltage $V_{OUT}$ temporarily rises greatly when the output voltage $V_{OUT}$ is controlled only by the inductor L1, and thus it takes time until the output voltage $V_{OUT}$ recovers the original voltage value.

In the present embodiment, at Time t1, the second current source 12 is activated to pull in the auxiliary current $I_{AUXM}$ from the load resistance $R_{LOAD}$ to the second current source 12. As shown in FIG. 3(a), the auxiliary current $I_{AUXM}$ is constant current. At Time t1, the load current $I_{LOAD}$ suddenly falls from $I_{LOAD1}$ to $I_{LOAD2}$, but the inductor current $I_{L1}$ decreases linearly. Since the auxiliary current $I_{AUXM}$ is constant current, the output voltage $V_{OUT}$ temporarily rises greatly immediately after Time t1, as shown in FIG. 3(d). After that, the rising rate of the output voltage $V_{OUT}$ rapidly becomes small due to the linear decrease in the inductor current $I_{L1}$ and the pulling-in of the constant auxiliary current $I_{AUXM}$, and then the output voltage $V_{OUT}$ falls.

When the load current $I_{LOAD}$ becomes consistent with the inductor current $I_{L1}$ at Time t2, the auxiliary current controller 13 stops pulling in the auxiliary current $I_{AUXM}$ to the second current source 12. Therefore, after Time t2, switching between the High-side switch $SW_H$ and the Low-side switch $SW_L$ is controlled only by the switching control circuit 5.

Figure 4:
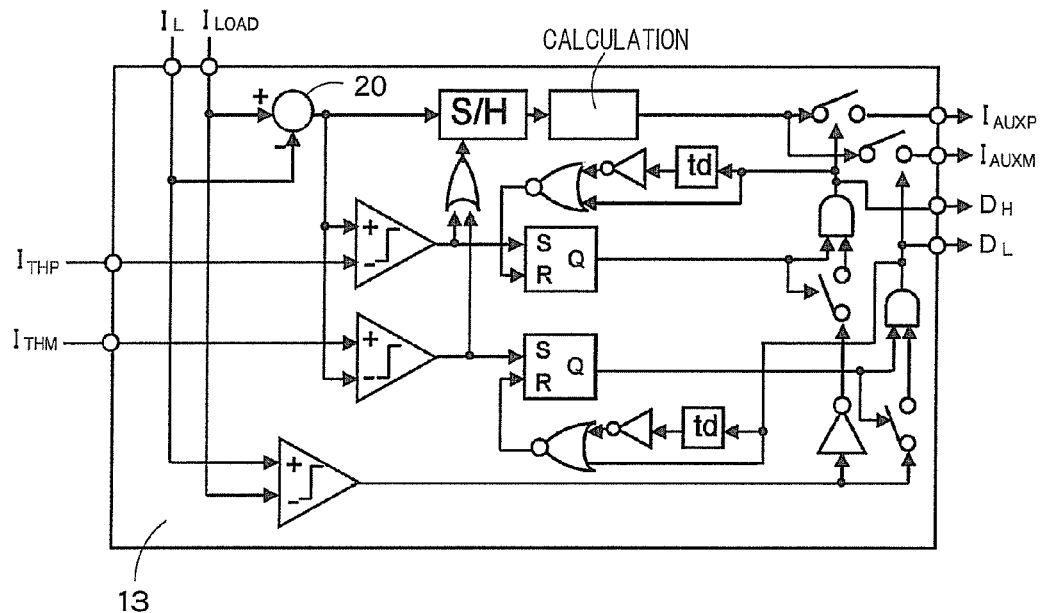
FIG. 4 is a circuit diagram showing an example of the internal configuration of an auxiliary current controller 13.

FIG. 4 is a circuit diagram showing an example of the internal configuration of the auxiliary current controller 13 performing the above control.

A concrete circuit of the auxiliary current controller 13 has no special characteristics in terms of circuit configuration itself since its concrete circuit can be automatically generated by a logic synthesis tool and can be arbitrarily varied. Therefore, in the present specification, explanation will be given not on a concrete connection relationship in the circuit of the auxiliary current controller 13 but on characteristic functions of the auxiliary current controller 13.

The auxiliary current controller 13 of FIG. 4 is inputted with the load current $I_{LOAD}$ and the inductor current $I_{L1}$.

Further, the auxiliary current controller 13 is inputted with two kinds of threshold values $I_{THP}$ and $I_{THM}$ for detecting the variation in the load current $I_{LOAD}$. By inputting the threshold values $I_{THP}$ and $I_{THM}$ from the outside, the timing to activate the first current source 11 and the second current source 12 can be arbitrarily adjusted.

Further, the auxiliary current controller 13 outputs the current $I_{AUXP}$ flowing through the first current source 11, the current $I_{AUXM}$ flowing through the second current source 12, a timing signal DH for turning on the High-side switch $SW_H$, and a timing signal DL for turning on the Low-side switch $SW_L$.

The auxiliary current controller 13 of FIG. 4 is formed to have the following functions 1) to 7).

1) If $(I_{LOAD}-I_{L1})>I_{THP}$, the auxiliary current $I_{AUXP}$ is supplied from the first current source 11 to the load resistance $R_{LOAD}$.

2) The auxiliary current $I_{AUXP}$ is constant current.

3) If $(I_{LOAD}-I_{L1})>I_{THP}$, the High-side switch $SW_H$ is turned on, and the Low-side switch $SW_L$ is turned off.

4) If $(I_{LOAD}-I_{L1})<I_{THM}$, the auxiliary current $I_{AUXM}$ is pulled in from the load resistance $R_{LOAD}$ to the second current source 12.

5) The auxiliary current $I_{AUXM}$ is constant current.

6) If $(I_{LOAD}-I_{L1})<I_{THM}$, the High-side switch $SW_H$ is turned off, and the Low-side switch $SW_L$ is turned on.

7) When $I_{LOAD}=I_{L1}$, the operation of the first current source 11 or the second current source 12 is stopped, and control on switching between the High-side switch $SW_H$ and the Low-side switch $SW_L$ is also stopped.

FIG. 4 shows an example of a circuit implementing the above functions 1) to 7), and its circuit configuration can be variously changed. The auxiliary current controller 13 of FIG. 4 includes a comparator 20 for comparing the load current $I_{LOAD}$ with the inductor current $I_{L1}$. This comparator 20 corresponds to a load current detector.

Next, mathematical formulas expressing current, voltage, etc. of nodes in the switching power supply device 1 of FIG. 1 will be explained using the waveform diagrams shown in FIG. 2 and FIG. 3. When the load current $I_{LOAD}$ before the load current $I_{LOAD}$ varies is defined as $I_{LOAD1}$, and the inductor current at this time is defined as $I_{L1}$, $I_{LOAD1}$ is equal to $I_{L1}$ in a stable state before the load current $I_{LOAD}$ varies.

The variation $\Delta I$ when the load current $I_{LOAD}$ suddenly increases can be expressed as the following Formula (1).

$$\Delta I = I_{LOAD2} - I_{LOAD1} = I_{LOAD2} - I_{L1} \tag{1}$$

When the load current $I_{LOAD}$ suddenly increases to $I_{LOAD2}$ at Time t1, the output voltage $V_{OUT}$ at this point (t1) can be expressed as the following Formula (2).

$$V_{OUT}(t1) = V_{REF} - C_1 \times \int \Delta I \, dt \tag{2}$$

Based on the right-hand side of the above Formula (2), the output voltage $V_{OUT}(t1)$ becomes smaller than the reference voltage $V_{REF}$, and the capacitor current $I_{C1}(t1)$ changes to $-\Delta I$. The capacitor current $I_{C1}$ becomes minus since the charges stored in the capacitor $C_1$ are discharged to flow through the load resistance $R_{LOAD}$.

When $\Delta I$ exceeds $I_{THP}$, the auxiliary current controller 13 turns on the High-side switch $SW_H$ by the control signal DH to continuously increase the inductor current $I_{L1}$. Further, the auxiliary current controller 13 supplies the auxiliary current $I_{AUXP}$ from the first current source 11 to the load resistance $R_{LOAD}$. The auxiliary current $I_{AUXP}$ is a current depending on $I_{LOAD}$ and $I_{L1}$, and is determined based on the amount of charge Q1 of the output voltage line $V_{OUT}$.

The amount of charge Q1 corresponding to the load current $I_{LOAD}$ flowing through the load resistance $R_{LOAD}$ between Time t1 and t2 can be expressed as the following Formula (3).

$$Q_1 = \int_{t_1}^{t_2} I_{LOAD}(t) dt = I_{LOAD2} \times (t_2 - t_1) \tag{3}$$

The inductor current $I_{L1}(t)$ at Time t between Time t1 and t2 can be expressed as the following Formula (4).

$$I_{L1}(t) = \tag{4}$$
$$I_{L1}(t_1) + \frac{V_{IN} - V_{OUT}}{L_1} \times (t - t_1) = I_{LOAD1} + \frac{V_{IN} - V_{OUT}}{L_1} \times (t - t_1)$$

At Time t2, the above Formula (4) can be expressed as the following Formula (5).

$$I_{L1}(t_2) = I_{LOAD1} + \frac{V_{IN} - V_{OUT}}{L_1} \times (t_2 - t_1) \tag{5}$$

At Time t2, $I_{L1}(t2)$ is equal to $I_{LOAD2}$, and thus the following Formula (6) can be obtained based on the above Formulas (1) and (5).

$$\Delta I = \frac{V_{IN} - V_{OUT}}{L_1} \times (t_2 - t_1) \tag{6}$$

Based on the above Formulas (5) and (6), the amount of charge Q2 supplied by the inductor current $I_{L1}(t)$ between Time t1 and t2 can be expressed as the following Formula (7).

$$Q_2 = \int_{t_1}^{t_2} I_L(t)\,dt \qquad (7)$$

$$= I_L(t_1)(t_2 - t_1) + \frac{V_{IN} - V_{OUT}}{2L_1} \times (t_2 - t_1)^2$$

$$= I_{LOAD1}(t_2 - t_1) + \frac{V_{IN} - V_{OUT}}{2L_1} \times (t_2 - t_1)^2$$

$$= I_{LOAD1}(t_2 - t_1) + \frac{\Delta I}{2} \times (t_2 - t_1)$$

In FIG. 2(c), the amount of charge Q3 which is not supplied by the inductor current can be expressed as the following Formula (8).

$$Q_3 = Q_1 - Q_2 \qquad (8)$$

$$= (I_{LOAD2} \times (t_2 - t_1)) - \left(I_{LOAD}(t_2 - t_1) + \frac{\Delta I}{2} \times (t_2 - t_1)\right)$$

$$= (I_{LOAD2} - I_{LOAD1})(t_2 - t_1) - \frac{\Delta I}{2} \times (t_2 - t_1)$$

$$= \Delta I (t_2 - t_1) - \frac{\Delta I}{2} \times (t_2 - t_1)$$

$$= \frac{\Delta I}{2} \times (t_2 - t_1)$$

The charge Q3 shown in the above Formula (8) is supplied from the first current source 11 to the load resistance $R_{LOAD}$ by the auxiliary current $I_{AUXP}(t)$ between Time t1 and t2. The charge Q4 supplied to the load resistance $R_{LOAD}$ by the auxiliary current $I_{AUXP}(t)$ between Time t1 and t2 can be expressed as the following Formula (9).

$$Q_4 = \int_{t_1}^{t_2} I_{AUXP}\,dt \qquad (9)$$

$$Q_4 = Q_3 = \frac{\Delta I}{2} \times (t_2 - t_1) = \int_{t_1}^{t_2} I_{AUXP}(t)\,dt$$

As an example, when the auxiliary current $I_{AUXP}(t)$ satisfying the above Formula (9) is a square-wave constant current flowing between Time t1 and t2 as shown in FIG. 2(a), the auxiliary current $I_{AUXP}$ between Time t1 and t2 can be expressed as the following Formula (10), and becomes 0 outside this period.

$$I_{AUXP} = \frac{\Delta I}{2} \qquad (10)$$

Figure 5:
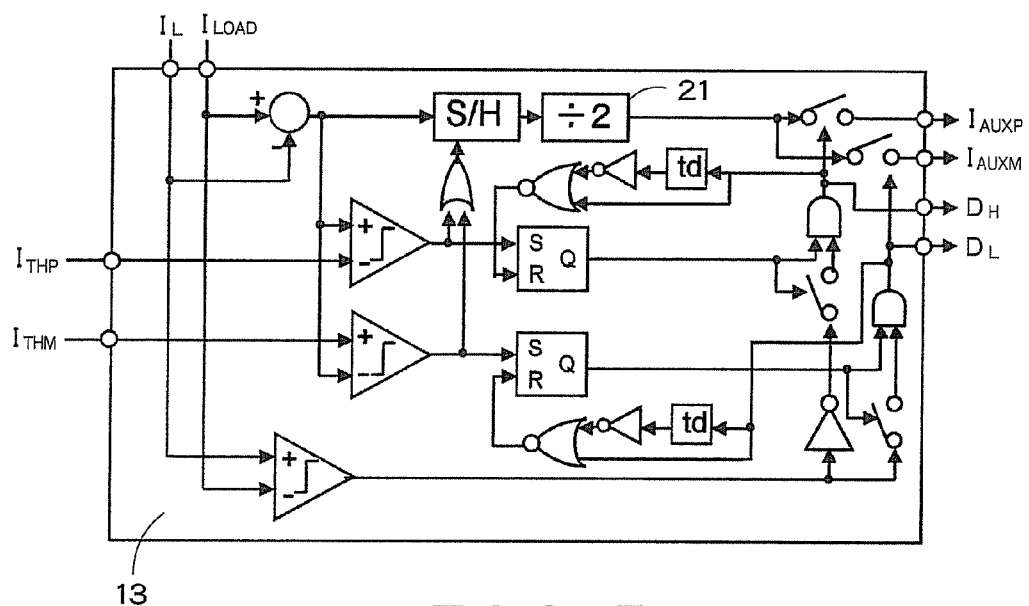
FIG. 5 is a circuit diagram showing another example of the internal configuration of the auxiliary current controller 13.

The auxiliary current controller 13 controls the first current source 11 so that the auxiliary current $I_{AUXP}$ of the above Formula (10) is supplied to the load resistance $R_{LOAD}$. The internal configuration of the auxiliary current controller 13 in this case is as shown in FIG. 5, for example. The auxiliary current controller 13 of FIG. 4 samples and holds a difference ($I_{LOAD} - I_L$) between the load current $I_{LOAD}$ and the inductor current $I_L$, and performs a predetermined calculation thereon to generate the auxiliary current $I_{AUXP}$. On the other hand, the auxiliary current controller 13 of FIG. 5 divides the difference by 2 as a predetermined calculation (see symbol 21 in FIG. 5) to obtain the auxiliary current $I_{AUXP}$ shown in the above Formula (10)

As stated above, when the load current $I_{LOAD}$ increases, the inductor current $I_{L1}$ is increased while supplying the auxiliary current $I_{AUXP}$ from the first current source 11 to the load resistance $R_{LOAD}$, which makes it possible to restrain the variation in the output voltage $V_{OUT}$ quickly.

Next, explanation will be given on the case where the load current $I_{LOAD}$ suddenly decreases. The variation $\Delta I$ when the load current $I_{LOAD}$ suddenly decreases can be expressed as the above Formula (1).

When the load current $I_{LOAD}$ suddenly decreases from $I_{LOAD1}$ to $I_{LOAD2}$ at Time t1, the output voltage $V_{OUT}$ at this point (t1) can be expressed as the following Formula (11).

$$V_{OUT}(t1) = V_{REF} + C_1 \times \int \Delta I\,dt \qquad (11)$$

Based on the right-hand side of the above Formula (11), the output voltage $V_{OUT}(t1)$ becomes higher than the reference voltage $V_{REF}$, and the capacitor current $I_{C1}(t1)$ increases by $\Delta I$ corresponding to the voltage applied to charge the capacitor $C_1$.

When $\Delta I$ exceeds $I_{THM}$, the Low-side switch $SW_L$ is turned on by the control signal DL to continuously reduce the inductor current $I_{L1}$. Further, the auxiliary current $I_{AUXM}$ is pulled in from the load resistance $R_{LOAD}$ to the second current source 12. The auxiliary current $I_{AUXM}$ is a current depending on the load current $I_{LOAD}$ and the inductor current $I_{L1}$, and is determined based on the amount of charge Q1 of the output voltage line $V_{OUT}$.

The charge Q4 corresponding to the auxiliary current $I_{AUXM}$ pulled in from the load resistance $R_{LOAD}$ to the second current source 12 between Time t1 and t2 can be expressed as the following Formula (12).

$$Q_4 = \int_{t_1}^{t_2} I_{AUXM}\,dt \qquad (12)$$

$$= Q_3 = \frac{\Delta I}{2} \times (t_2 - t_1) = \int_{t_1}^{t_2} I_{AUXM}(t)\,dt$$

As an example, when the auxiliary current $I_{AUXM}(t)$ satisfying the above Formula (12) is a square-wave constant current flowing between Time t1 and t2 as shown in FIG. 3(a), the auxiliary current $I_{AUXM}$ between Time t1 and t2 can be expressed as the following Formula (13), and becomes 0 outside this period.

$$I_{AUXM} = \frac{\Delta I}{2} \qquad (13)$$

The auxiliary current controller 13 controls the second current source 12 so that the auxiliary current $I_{AUXM}$ of the above Formula (11) is pulled in from the load resistance $R_{LOAD}$ to the second current source 12. Also in this case, the internal configuration of the auxiliary current controller 13 is as shown in FIG. 5, for example.

Both in FIG. 2 and FIG. 3, the output voltage $V_{OUT}$ temporarily falls or rises when the square-wave auxiliary current $I_{AUXP}$ or $I_{AUXM}$ is passed through the first current source 11 or the second current source 12.

This is because the auxiliary current is insufficient immediately after the load current $I_{LOAD}$ varies. Accordingly, when the auxiliary current passed through the first current source 11 or the second current source 12 has a saw-tooth waveform corresponding to the waveform of the inductor current when the load current $I_{LOAD}$ varies, the deficiency in the auxiliary current immediately after the load current $I_{LOAD}$ varies can be prevented while restraining the variation in the output voltage $V_{OUT}$.

FIG. 6 shows waveform diagrams of nodes in the switching power supply device 1 in the case of supplying saw-tooth-wave auxiliary current to the load resistance $R_{LOAD}$ when the load current increases. The auxiliary current $I_{AUXP}(t)$ of FIG. 6 can be expressed as the following Formula (14).

$$I_{AUXP}(t) = (I_{LOAD2} - I_{LOAD1}) - (IL(t) - I_{LOAD1}) \quad (14)$$
$$= I_{LOAD2} - IL(t)$$

The auxiliary current $I_{AUXP}(t)$ between Time t1 and t2 can be expressed as the above Formula (14), and becomes 0 outside this period.

FIG. 7 is a circuit diagram showing an example of the internal configuration of the auxiliary current controller 13 capable of generating auxiliary current having a saw-tooth waveform. The functions of the auxiliary current controller 13 of FIG. 7 are different in the functions 2) and 5) among the above functions 1) to 7), in which the auxiliary current is not constant current but saw-tooth-wave current. More concretely, a unit 22 surrounded with a dotted line in FIG. 7 performs the calculation of the above Formula (14).

As stated above, in the first embodiment, when the load current $I_{LOAD}$ exceeds a threshold value due to a load variation, the auxiliary current is passed through the first current source 11 or the second current source 12, which makes it possible to quickly restrain the variation in the output voltage $V_{OUT}$ caused by the load variation.

Second Embodiment

In the first embodiment, the load current $I_{LOAD}$ is inputted into the auxiliary current controller 13 to detect a load variation by the load current $I_{LOAD}$. On the other hand, a second embodiment explained below is characterized in detecting the load variation by the capacitor current flowing through the capacitor $C_1$ in the lowpass filter 4.

FIG. 8 is a block diagram showing a schematic structure of the switching power supply device 1 according to the second embodiment. The switching power supply device 1 of FIG. 8 is similar to FIG. 1 in block configuration itself, but different from FIG. 1 in a signal inputted into the auxiliary current controller 13. FIG. 8 is different from FIG. 1 in that the auxiliary current controller 13 is inputted with the capacitor current $I_{C1}$. Instead of that, the auxiliary current controller 13 is not inputted with the load current $I_{LOAD}$ and the inductor current $I_{L1}$.

As shown in FIG. 2, when the load current $I_{LOAD}$ suddenly increases at Time t1, the capacitor current $I_{C1}$ can be expressed as the following Formula (15).

$$I_{C1}(t1) = -(I_{LOAD2} - I_{LOAD1}) = -\Delta I \quad (15)$$

As will be understood from this Formula (15), the capacitor current $I_{C1}$ depends on the load current $I_{LOAD1}$ and $I_{LOAD2}$. Accordingly, the amount of current flowing in/out from the load resistance $R_{LOAD}$ at Time t1 can be determined based on $\Delta I$. Further, Time t2, at which $I_{L1}(t)$ becomes equal to $I_{LOAD2}$, can be detected based on the timing when the capacitor current becomes $I_{C1}(t2)$.

For example, when the square-wave current $I_{AUXP}$ (I=$\Delta I/2$) is continuously supplied from the first current source 11 to the load resistance $R_{LOAD}$, Time t2, at which $I_{L1}(t)$ becomes equal to $I_{LOAD2}$, is the point when the capacitor current $I_{C1}(t2)$ becomes $\Delta I/2$.

FIG. 9 is a circuit diagram showing an example of the internal configuration of the auxiliary current controller 13 in the second embodiment. The auxiliary current controller 13 of FIG. 9 is substantially the same as FIG. 4 in circuit configuration, but different from FIG. 4 in that the auxiliary current controller 13 is inputted with the capacitor current $I_{C1}$. Instead of that, the auxiliary current controller 13 is not inputted with the load current $I_{LOAD}$ and the inductor current $I_{L1}$. The capacitor current $I_{C1}$ is detected by a capacitor current detector 23 of FIG. 9.

As stated above, in the second embodiment, the capacitor current $I_{C1}$ in the lowpass filter 4 is inputted into the auxiliary current controller 13 to detect a load variation, which makes it possible to set the operation timing of the first current source 11 and the second current source 12 without inputting the load current $I_{LOAD}$ and the inductor current $I_{L1}$ into the auxiliary current controller 13.

Third Embodiment

A third embodiment explained below is characterized in detecting a load variation by the output voltage $V_{OUT}$ and the reference voltage $V_{REF}$.

FIG. 10 is a block diagram showing a schematic structure of the switching power supply device 1 according to the third embodiment. The switching power supply device 1 of FIG. 10 is similar to FIG. 1 in block configuration itself, but different from the first and second embodiments in signals inputted into the auxiliary current controller 13. FIG. 10 is different from FIG. 1 in that the auxiliary current controller 13 is inputted with the output voltage $V_{OUT}$ and the reference voltage $V_{REF}$. Instead of that, the auxiliary current controller 13 is not inputted with the load current $I_{LOAD}$ and the inductor current $I_{L1}$.

If the output voltage $V_{OUT}(t)$ is obtained, the load current $I_{LOAD}(t)$ can be obtained based on the following Formula (16).

$$I_{LOAD}(t) = C_1 \times \frac{dV_{OUT}(t)}{dt} \quad (16)$$

As shown in Formula (16), the load current $I_{LOAD}(t)$ can be obtained from the variation in the output voltage $V_{OUT}(t)$. In the first embodiment, the operation of the first/second current source 11/12 is stopped at the point when the inductor current $I_{L1}$ becomes equal to the load current $I_{LOAD}$. On the other hand, in the third embodiment, the operation of the first/second current source 11/12 is stopped at the point when the output voltage $V_{OUT}$ becomes consistent with the reference voltage $V_{REF}$ after the load variation. This is equivalent to that the inductor current $I_{L1}$ becomes equal to the load current $I_{LOAD}$.

For example, when continuously passing the square-wave auxiliary current $I_{AUXP}$ or $I_{AUXM}$ (I=$\Delta I/2$) through the first/second current source 11/12, the operation of the first/second current source 11/12 is stopped at the point when the output voltage $V_{OUT}$ becomes consistent with the reference voltage $V_{REF}$.

FIG. 11 is a circuit diagram showing an example of the internal configuration of the auxiliary current controller 13 in the third embodiment. The auxiliary current controller 13 of FIG. 11 is substantially the same as FIG. 4 in circuit configuration, but different from FIG. 4 in that the auxiliary current controller 13 is inputted with the output voltage $V_{OUT}$ and the reference voltage $V_{REF}$. Instead of that, the auxiliary current controller 13 is not inputted with the load current $I_{LOAD}$ and the inductor current $I_{L1}$. The output voltage $V_{OUT}$ is detected by an output voltage detector 24 of FIG. 11.

As stated above, in the third embodiment, the output voltage $V_{OUT}$ and the reference voltage $V_{REF}$ are inputted into the auxiliary current controller 13 to detect a load variation, which makes it possible to set the operation timing of the first current source 11 and the second current source 12 without inputting the load current $I_{LOAD}$ and the inductor current $I_{L1}$ into the auxiliary current controller 13.

Fourth Embodiment

A fourth embodiment explained below is characterized in providing a plurality of current sources and a plurality of switches each switching whether or not to activate the current source corresponding thereto.

FIG. 12 is a block diagram showing a schematic structure of the switching power supply device 1 according to the fourth embodiment. The switching power supply device 1 of FIG. 12 is different from FIG. 1 in configurations of the first current source 11 and the second current source 12.

The first current source 11 of FIG. 12 has a plurality of first current source units 31 and 32 each capable of supplying a different amount of current to the load resistance $R_{LOAD}$, and a plurality of first switches $SW_{AP}$ and $SW_{AP2}$ each connected between the first current source unit 31/32 corresponding thereto and the output voltage line $V_{OUT}$, and capable of individually switching whether or not to supply the current from the corresponding first current source unit 31/32 to the load resistance $R_{LOAD}$.

Further, the second current source 12 has a plurality of second current source units 33 and 34 each capable of supplying a different amount of current to the load resistance $R_{LOAD}$, and a plurality of second switches $SW_{AM}$ and $SW_{AM2}$ each connected between the second current source unit 33/34 corresponding thereto and the output voltage line $V_{OUT}$, and capable of individually switching whether or not to supply the current from the corresponding second current source unit 33/34 to the load resistance $R_{LOAD}$.

In the example of FIG. 12, the first current source 11 has the first current source units 31 and 32 and the first switches $SW_{AP}$ and $SW_{AP2}$, while the second current source 12 has the second current source units 33 and 34 and the second switches $SW_{AM}$ and $SW_{AM1}$. However, the number of current source units and the number of switches should not be particularly limited.

In the example of FIG. 12, the first current source unit 31 passes fixed current $I_{AUXP}$, and the first current source unit 32 passes fixed current $2I_{AUXP}$. The second current source unit 33 passes fixed current $I_{AUXM}$, and the second current source unit 34 passes fixed current $2I_{AUXM}$.

The auxiliary current controller 13 has three threshold values $I_{THP1}$ ($=2I_{AUXP}$), $I_{THP2}$ ($=4I_{AUXP}$), and $I_{THP3}$ ($=6I_{AUXP}$) for the first current source 11, and three threshold values $I_{THM1}$ ($=2I_{AUXM}$), $I_{THM2}$ ($=4I_{AUXM}$), and $I_{THM3}$ ($=6I_{AUXM}$) for the second current source 12.

When the load current $I_{LOAD}$ increases, if $I_{THP2}>\Delta I>I_{THP1}$, the first switch $SW_{AP}$ is turned on. If $I_{THP3}>\Delta I>I_{THP2}$, the first switch $SW_{AP2}$ is turned on. If $\Delta I>I_{THP3}$, both of the first switches $SW_{AP}$ and $SW_{AP2}$ are turned on. The first switch $SW_{AP}$ or $SW_{AP2}$ is continuously turned on only until the inductor current $I_{L1}$ becomes equal to the load current $I_{LOAD}$.

When the load current $I_{LOAD}$ decreases, if $I_{THM2}>\Delta I>I_{THM1}$, the second switch $SW_{AM}$ is turned on. If $I_{THM3}>\Delta I>I_{THM2}$, the second switch $SW_{AM2}$ is turned on. If $\Delta I>I_{THM3}$, both of the second switches $SW_{AM}$ and $SW_{AM2}$ are turned on. The second switch $SW_{AM}$ or $SW_{AM2}$ is continuously turned on only until the inductor current $I_{L1}$ becomes equal to the load current $I_{LOAD}$.

As stated above, in the fourth embodiment, a plurality of current sources capable of pulling in the auxiliary current to the load resistance $R_{LOAD}$ and a plurality of current sources capable of pulling out the auxiliary current from the load resistance $R_{LOAD}$ are provided, and whether or not to use these current sources is set depending on a load variation. Accordingly, the amount of auxiliary current can be adjusted finely depending on the load variation, and the variation in the output voltage $V_{OUT}$ can be restrained quickly even if the load variation is large.

Fifth Embodiment

A fifth embodiment explained below is characterized in providing switches each switching whether or not to activate the first current source 11 or the second current source 12 corresponding thereto.

FIG. 13 is a block diagram showing a schematic structure of the switching power supply device 1 according to the fifth embodiment. The switching power supply device 1 of FIG. 13 is different from FIG. 1 in that a first switch $SW_{AP}$ is arranged between the first current source 11 and the output voltage line $V_{OUT}$, and that a second switch $SW_{AM}$ is arranged between the second current source 12 and the output voltage line $V_{OUT}$.

Switching between the first switch $SW_{AP}$ and the second switch $SW_{AM}$ is controlled by the auxiliary current controller 13. In FIG. 1, the auxiliary current controller 13 transmits operation control signals to the first current source 11 and the second current source 12, while in FIG. 13, such operation control signals are not provided. This makes it possible to simplify the internal configuration of the first current source 11 and the second current source 12.

FIG. 14 shows waveform diagrams of nodes in the switching power supply device 1 of FIG. 13. In FIG. 14, at Time t1, a load variation $\Delta I$ ($=3IA$) occurs. At Time t1, $h_{THP}<\Delta I$, and thus the auxiliary current controller 13 turns on the first switch $SW_{AP}$ and keeps the first switch $SW_{AP}$ turned on until Time t2, at which the load current $I_{LOAD}$ becomes consistent with the inductor current IL.

After Time t2, $I_{L1}(t)>I_{LOAD}(t)$, and thus the output voltage $V_{OUT}$ does not decrease and the variation in the output voltage $V_{OUT}$ is restrained.

As stated above, in the fifth embodiment, the first and second switches $SW_{AP}$ and $SW_{AM}$ are arranged to switch whether or not to activate the first and second current sources 11 and 12, and the auxiliary current controller 13 controls switching between the first and second switches $SW_{AP}$ and $SW_{AM}$ to restrain the variation in the output voltage $V_{OUT}$ caused by a load variation. Both when pulling in the auxiliary current to the load resistance $R_{LOAD}$ and when pulling out the auxiliary current from the load current $I_{LOAD}$, the auxiliary current controller 13 can use only one threshold value for judging whether or not to pass the auxiliary current. However, since the variation in the output voltage $V_{OUT}$ can be restrained as shown in FIG. 14 by switching the first and second switches $SW_{AP}$ and $SW_{AM}$, the structure can be simplified as a whole, compared to the fourth embodiment using a plurality of threshold values.

Sixth Embodiment

A sixth embodiment explained below is characterized in controlling the load variation in view of the delay in signal transmission occurring in the auxiliary current controller 13.

FIG. 15 is a block diagram showing a schematic structure of the switching power supply device 1 according to the sixth embodiment. The switching power supply device 1 of FIG. 15 is different from FIG. 1 in that an offset signal $I_{OS}$ is additionally inputted into the auxiliary current controller 13.

The offset signal $I_{OS}$ is provided in view of the delay time in signal transmission occurring in the auxiliary current controller 13. The threshold values $I_{THP}$ and $I_{THM}$ are increased/reduced by the offset signal $I_{OS}$ to generate new threshold values $I_{THP}$ and $I_{THM}$, and the timing to activate the first current source 11 or the second current source 12 is switched by using the new threshold values.

Accordingly, the load current $I_{LOAD}$ can be compared to the threshold values $I_{THP}$ and $I_{THM}$ in view of the delay time in signal transmission occurring in the auxiliary current controller 13. Since the first and second current sources 11 and 12 can be activated while cancelling the influence of the delay time in signal transmission, the variation in the output voltage $V_{OUT}$ caused by a load variation can be quickly restrained with higher accuracy.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A control circuit of a switching power supply device, the switching power supply device generating a square wave voltage from an input voltage by switching a High-side switch and a Low-side switch and generating a direct-current output voltage by smoothing the square wave voltage by a lowpass filter comprising an inductor and a capacitor,
the control circuit comprising:
a first current source capable of supplying an auxiliary current to a load resistance of the switching power supply device when a load current flowing through the load resistance increases;
a second current source capable of pulling in a current from the load resistance when the load current flowing through the load resistance decreases; and
an auxiliary current controller configured to activate the first current source or the second current source from when a variation in the load current flowing through the load resistance is detected to have exceeded a predetermined level until a current flowing through the inductor becomes equal to the load current flowing through the load resistance.

2. The control circuit of claim 1,
wherein the auxiliary current controller increases the current flowing through the inductor by turning on the High-side switch and turning off the Low-side switch while the first current source is activated, and reduces the current flowing through the inductor by turning off the High-side switch and turning on the Low-side switch while the second current source is activated.

3. The control circuit of claim 1,
wherein the auxiliary current controller passes a constant current through the first current source or the second current source from when a variation in the load current flowing through the load resistance is detected to have exceeded a predetermined level until the current flowing through the inductor becomes equal to the load current flowing through the load resistance.

4. The control circuit of claim 1,
wherein the auxiliary current controller changes the current flowing through the first current source or the second current source during a load variation period from when a variation in the load current flowing through the load resistance is detected to have exceeded a predetermined level until the current flowing through the inductor becomes equal to the load current flowing through the load resistance, so that the output voltage of the switching power supply device becomes constant.

5. The control circuit of claim 4,
wherein the auxiliary current controller controls the current waveform flowing through the first current source or the second current source during the load variation period to be a saw tooth waveform, so that the output voltage of the switching power supply device becomes constant.

6. The control circuit of claim 1, further comprising:
a load current detector configured to detect the load current flowing through the load resistance;
wherein the auxiliary current controller detects whether the load current changes, based on the load current detected by the load current detector.

7. The control circuit of claim 1, further comprising:
a capacitor current detector configured to detect a current flowing through the capacitor,
wherein the auxiliary current controller detects whether the load current changes, based on the current detected by the capacitor current detector.

8. The control circuit of claim 1, further comprising:
an output voltage detector configured to detect the output voltage,
wherein the auxiliary current controller detects whether the load current changes, based on a time-varying value of the output voltage detected by the output voltage detector.

9. The control circuit of claim 1,
wherein the first current source comprises:
a plurality of first current source units each capable of supplying a different amount of current to the load resistance; and
a plurality of first switches each connected between the corresponding first current source unit and an output voltage line of the switching power supply device, and each capable of individually switching whether or not to supply the current from the corresponding first current source unit to the load resistance,
the second current source comprises:
a plurality of second current source units each capable of pulling in a different amount of current from the load resistance;
a plurality of second switches each connected between the corresponding second current source unit and the output voltage line of the switching power supply device, and each capable of individually switching whether or not to pull in the current from the load resistance to the corresponding second current source unit, and the auxiliary current controller controls switching between the first switches and the second switches from when a change in the load current flowing through the load resistance is detected until the current flowing through the inductor becomes equal to the load current flowing through the load resistance, based on comparison between a variation in the load current and a plurality of threshold values.

10. The control circuit of claim 1, further comprising:
a first switch connected between the first current source and an output voltage line of the switching power supply device, and capable of switching whether or not to supply the current from the first current source to the load resistance; and
a second switch connected between the second current source and the output voltage line of the switching power supply device, and capable of switching whether or not to pull in the current from the load resistance to the second current source,
wherein the auxiliary current controller controls switching between the first switch and the second switch from when a change in the load current flowing through the load resistance is detected until the current flowing through the inductor becomes equal to the load current flowing through the load resistance.

11. The control circuit of claim 1,
wherein the auxiliary current controller determines whether or not to activate the first current source or the second current source based on a comparison between a variation in the load current and a threshold value after an offset adjustment.

12. A switching power supply device comprising:
a power stage circuit configured to generate a square wave voltage from an input voltage by switching a High-side switch and a Low-side switch to generate a direct-current output voltage by smoothing the square wave voltage by a lowpass filter comprising an inductor and a capacitor; and
a control circuit configured to control the power stage circuit,
wherein the control circuit comprises:
a switching control circuit configured to control switching between the High-side switch and the Low-side switch so that the output voltage generated by the power stage circuit coincides with a reference voltage; and
a load variation control circuit configured to control the output voltage depending on a variation in a load current flowing through a load resistance of the switching power supply device, and
the load variation control circuit comprises:
a first current source capable of supplying an auxiliary current to the load resistance when the load current flowing through the load resistance increases;
a second current source capable of pulling in a current from the load resistance when the load current flowing through the load resistance decreases; and
an auxiliary current controller configured to activate the first current source or the second current source from when a variation in the load current flowing through the load resistance is detected to have exceeded a predetermined level until a current flowing through the inductor becomes equal to the load current flowing through the load resistance.

13. The device of claim 12,
wherein the auxiliary current controller increases the current flowing through the inductor by turning on the High-side switch and turning off the Low-side switch while the first current source is activated, and reduces the current flowing through the inductor by turning off the High-side switch and turning on the Low-side switch while the second current source is activated.

14. The device of claim 12,
wherein the auxiliary current controller passes a constant current through the first current source or the second current source from when a variation in the load current flowing through the load resistance is detected to have exceeded a predetermined level until the current flowing through the inductor becomes equal to the current flowing through the load resistance.

15. The device of claim 12,
wherein the auxiliary current controller changes the current flowing through the first current source or the second current source during a load variation period from when a variation in the load current flowing through the load resistance is detected to have exceeded a predetermined level until the current flowing through the inductor becomes equal to the load current flowing through the load resistance, so that the output voltage of the switching power supply device becomes constant.

16. The device of claim 15,
wherein the auxiliary current controller controls the current waveform flowing through the first current source or the second current source during the load variation period to be a saw tooth waveform, so that the output voltage of the switching power supply device becomes constant.

17. The device of claim 12, further comprising:
a load current detector configured to detect the load current flowing through the load resistance;
wherein the auxiliary current controller detects whether the load current changes, based on the load current detected by the load current detector.

18. The device of claim 12, further comprising:
a capacitor current detector configured to detect a current flowing through the capacitor,
wherein the auxiliary current controller detects whether the load current changes, based on the current detected by the capacitor current detector.

19. The device of claim 12, further comprising:
an output voltage detector configured to detect the output voltage,
wherein the auxiliary current controller detects whether the load current changes, based on a time-varying value of the output voltage detected by the output voltage detector.

20. The device of claim 12,
wherein the first current source comprises:
a plurality of first current source units each capable of supplying a different amount of current to the load resistance; and
a plurality of first switches each connected between the corresponding first current source unit and an output voltage line of the switching power supply device, and each capable of individually switching whether or not to supply the current from the corresponding first current source unit to the load resistance,
the second current source comprises:
a plurality of second current source units each capable of pulling in a different amount of current from the load resistance;
a plurality of second switches each connected between the corresponding second current source unit and the output voltage line of the switching power supply device, and each capable of individually switching whether or not to pull in the current from the load resistance to the corresponding second current source unit, and the auxiliary current controller controls switching between the first switches and the second switches from when a change in the load current flowing through the load resistance is detected until the current flowing through the inductor becomes equal to the load current flowing through the load resistance, based on comparison between a variation in the load current and a plurality of threshold values.

* * * * *